United States Patent [19]

Stamm

[11] 3,725,300

[45] Apr. 3, 1973

[54] REGENERATION OF BASIC ALUMINA USED AS A CATALYST IN DEHYDROHALOGENATION OF BETA-HALOALKYLPHOSPHONATE ESTERS

[75] Inventor: Walter Stamm, Tarrytown, N.Y.

[73] Assignee: Stauffer Chemical Company, New York, N.Y.

[22] Filed: Oct. 7, 1970

[21] Appl. No.: 78,947

Related U.S. Application Data

[62] Division of Ser. No. 696,991, Jan. 11, 1968, Pat. No. 3,576,924.

[52] U.S. Cl. ................. 252/412, 252/411, 423/481
[51] Int. Cl. .................. B01j 11/70, B01j 11/02
[58] Field of Search ........ 252/411 R, 412; 260/986, 654 D, 260/677 X, 680 X; 423/481

[56] References Cited
UNITED STATES PATENTS 2,033,374  3/1936  Gayer ............................. 252/412 X
2,059,553  11/1936  Churchill ......................... 252/412 X Primary Examiner—Daniel E. Wyman
Assistant Examiner—P. E. Konopka
Attorney—Robert C. Sullivan, Donald M. MacKay, Paul J. Juettner, Daniel C. Block, Wayne C. Jaeschke and Daniel S. Arty

[57] ABSTRACT

A process is provided for the preparation of $\alpha,\beta$-olefinically unsaturated alkyl phosphonate esters by the dehydrohalogenation of the corresponding $\beta$-haloalkyl phosphonate esters comprising contacting the haloalkyl phosphonate with basic alumina. A method is also provided for the regeneration of spent alumina catalyst by heating to a temperature in excess of 200° C.

5 Claims, No Drawings

REGENERATION OF BASIC ALUMINA USED AS A CATALYST IN DEHYDROHALOGENATION OF BETA-HALOALKYLPHOSPHONATE ESTERS

RELATED APPLICATION

This application is a division of application Ser. No. 696,991, filed Jan. 11, 1968, now U.S. Pat. No. 3,576.924.

The present invention relates to a new process for the preparation of olefinically unsaturated alkyl phosphonates by the dehydrohalogeantion of the corresponding haloalkyl phosphonate ester. More particularly, this improved process relates to the use of a heterogeneous dehydrohalogeantion system comprising basic alumina.

In recent times, various vinyl phosphonates have been used in polymerization to form a wide variety of products. These phosphonates have been used as copolymerizing agents, terminating agents, and cross-linking agents in those applications where a degree of flame retardance is of special value in polymeric compositions. These compounds have advantageously been so used as they do impart a degree of flame resistance to the polymer without adversely affecting other desirable properties of the polymer or polymer composition. With the increase in interest in these compounds, various methods of preparing them were proposed. The most effective methods proposed for the aforesaid preparation of these compound was by the dehydrohalogenation of a corresponding beta-halo alkyl phosphonate through the use of a stoichiometric amount of an alkali metal salt of a lower fatty acid. Preferred among such alkali metal salts has been anhydrous sodium acetate. Utilization of this dehydrohalogenation agent results in yields of from about 10 to about 90 percent. Particular procedures and descriptions of such dehydrohalogenation reactions and reactants are found in U. S. Pat. No. 2,959,609, issued Nov. 8, 1960, to Leupold and Zorn (cf. German DAS 1,006,414) and U. S. Pat. No. 3,064,030, issued Nov. 13, 1962, to Chadwick et al. Various other dehydrohalogenation agents and systems have been proposed, and these agents have met with varying degrees of success. None of these processes, however, has been found to be adaptable to a continuous process.

In accordance with the present invention, a continuous process for the preparation of olefinically unsaturated alkyl phosphonates is provided. This process comprises dehydrohalogenation of the corresponding haloalkyl phosphonate by contacting it with basic alumina. The basic alumina serves as a highly selective dehydrohalogenating agent and has the additional advantage that it can be regenerated easily.

The process of this invention is applicable to compounds of the formula:

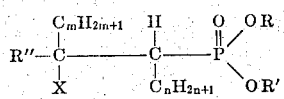

wherein $n$ and $m$ are integers having values of from about 0 to about 6 and preferably from about 0 to about 4, X is a halogen atom having a molecular weight greater than 30, such as chlorine, bromine or iodine, R and R' are hydrocarbyl groups consisting essentially of hydrogen and carbon and containing from about one to about 18 carbon atoms, inclusive; R'' is a hydrocarbyl group consisting essentially or hydrogen and carbon and containing from zero to 18 carbon atoms and containing from zero to 18 carbon atoms such that when R'' contains zero carbon atoms R'' is hydrogen.

By the term "hydrocarbyl consisting essentially of hydrogen and carbon" is meant hydrocarbon groups such as the aliphatic and aromatic groups substituted by, or which include only such groups as do not affect the essential reactivity or character of the group. Such groups include any inert or non-reactive substituent such as chloro groups, fluoro groups, nitro groups, hydroxy groups, mercapto groups, sulfone groups, ethoxy groups, methoxy groups, nitrile, thioether groups, ether groups, ester groups, keto groups and the like.

Illustrative of such aliphatic groups as are represented by R, R' and R'' above are alkyl, such as methyl, ethyl, propyl, butyl, pentyl, hexyl, nonyl, pentenyl, hexenyl, cycloalkyl, such as cyclopropyl, cyclobutyl, cyclopentyl, cyclohexyl, cyclohexenyl and the like; and the aromatic such as phenyl, benzyl, phenethyl, tolyl, naphthyl, and the like.

Particularly in point is the case wherein $n$ and M are O and R and R' are chloroethyl and R'' is hydrogen as this compound is the precursor for bis($\beta$-chloroethyl)vinylphosphonate. This product will be used hereinafter as representative of this class of compound, and for convenience will be designated "Bis-Beta."

By the term "basic alumina" is meant a "synthetic" aluminum oxide which is essentially free of acidic residues. The alumina best suited for the process of this invention is prepared by heating any aluminum hydroxide, oxy-hydroxide or ammonium alum at 1,000° C., though heating above 250° C. can also provide an alumina useful in my process. Schematically, the dehydration proceeds in steps as follows:

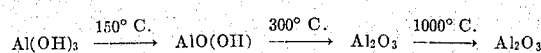

The latter $Al_2O_3$ has a most desirable small particle size; it is not hygroscopic and has the greatest adsorptive power. It is commercially available in different grades, one such grade known as "Brockmann activated alumina, basic" and is available in different particle sizes, the smaller sizes being most effective in the present invention.

As indicated above, the basic alumina catalyst of this invention is highly selective in dehydrohalogenating the compounds specified above. This agent selectively dehydrohalogenates a chlorine, bromine or iodine substituent from the $\beta$-carbon of an alkyl group bonded directly to the phosphorus atom. It does not dehydrohalogenate halogen atoms substituted on alkyl groups bonded to oxygen atoms to the phosphorus atom. Accordingly, in reference to the formula given above wherein R and/or R' is, for example, a chloroethyl substituent, the basic alumina catalyst will selectively dehydrohalogenate X and not dehydrohalogenate either chlorine from the chloroethyl substituents R or R'. This of considerable importance in any process for dehydrohalogenation in that it increases yield and simplifies considerably recovery problems. This is illustrated by reaction mechanism set forth below:

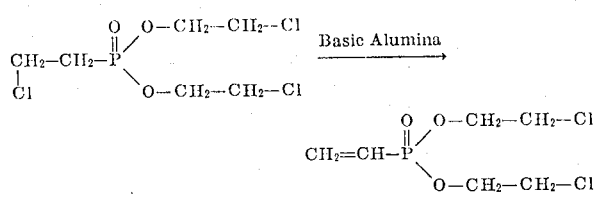

$$CH_2=CH-\overset{O}{\underset{\underset{O-CH_2-CH_2-Cl}{|}}{P}}\diagup\overset{O-CH_2-CH_2-Cl}{}$$

For convenience, in describing the process of this invention, chloroethyl bis(2-chloroethyl)phosphonate will be used as illustrative of the haloalkyl phosphonate precursors. This compound will be hereinafter designated CEP.

While the CEP can be effectively contacted with the basic alumina by such arrangements as passing this material over a bed of basic alumina, it is preferred to pass the CEP through the alumina packed in a long, vertically arranged column to effect a selectively complete dehydrohalogenation. Preferably, the column will be of relatively great length and small diameter.

When utilized commercially, it is desirable to provide more than one alumina packed column in order to provide continuous operation while a spent column is regenerated, as is discussed hereinafter.

While undiluted CEP can be used directly with the basic alumina agent, it has been found desirable to dilute the CEP with a suitable solvent inert to the reaction conditions. Suitable solvents include carbon tetrachloride, chloroform, methylene chloride, carbon bisulfide, benzene, toluene, acetone, methyl ethyl ketone, acetonitrile, tetrahydrofurane, cyclohexane, pentane, dimethyl sulfide, nitromethane, trichlorofluoroethylene, ethylene dichloride. Because of reduced costs of removal by stripping, the low boiling solvents are preferred.

If undiluted CEP is used it is desirable to pass the material through the alumina catalyst column under a slight pressure depending on viscosity and temperature. This pressure can be applied by any means conventional in the art.

The CEP can be used in these solvents in concentrations of from about 10 to about 90 percent by weight but it is preferred to use concentrations of from about 40 to about 80 percent.

The dehydrohalogenation of the CEP is effectively conducted at room temperature, although temperatures from about 0° to about 130° C. can be used if desired. It is preferred, however, to utilize a temperature of from about 15° to about 100° C. and most preferred at temperatures of from about 35° C. to about 80° C.

The CEP solution is introduced at the top end of the column and caused to pass through the basic alumina dehydrohalogenating agent. The rate of flow is regulated to provide maximum reaction. The rate of dehydrohalogenation depends on the rate of flow and on the length of the packed column. At a sufficient length of the column, the flow rates need not be regulated but allowed to proceed under their own gravity.

The dehydrohalogenated CEP solution is recovered from the bottom end of the alumina column and is conveniently stripped of solvent by flash distillation. The solvent recovered can be effectively recycled to the system.

After the alumina packed column has been spent, it can be easily regenerated by washing it with aqueous base, such as 10 percent sodium hydroxide, followed by water wash and subsequent heating to above 250° C. Alternatively and more economically, it can be easily regenerated by heating it to a temperature of from about 200° to over 1,000° C. Thereby, essentially pure hydrogen chloride is recovered and can be used in other operations.

While it is not desirable to utilize aqueous solvents or water containing solvents, the reaction conditions need not be strictly anhydrous. Although the reaction can be effectively conducted under anhydrous conditions, stringent control is unnecessary. Small amounts of water present in the reactants or dehydrohalogenation agent do not adversely affect the degree of yield unless such water is present in excessive amounts. Water present in amounts from about 0 to about 5 percent based on the weight of the materials does not produce any adverse effect. Such water, however, must be ultimately removed and accordingly, it is desired to maintain water to a minimum.

Though a selective dehydrohalogenation is desirable and easily achieved in the process, the selective dehydrohalogenation need not be quantitative with regard to β-haloethylphosphonate starting material. Unreacted starting material can be easily separated from the reaction product by fractionation and can be recycled or combined with fresh starting material for dehydrochlorination. Under optimum reaction conditions, however, vinylphosphonates or other α, β-unsaturated phosphonates can be obtained quantitatively and in practically 100 percent purity. In such instances, the product does not require further purification by distillation. The production of high purity α, β-unsaturated alkylphosphonates is the principal feature of this invention.

In the example which follows and throughout the specification, all parts and percentages are by weight unless otherwise specified.

EXAMPLE

Chloroethyl bis-β-chloroethylphosphonate, 27 grams are dissolved in 75 milliliters of chloroform. This solution is poured into a vertical column, 25 inches long and 3 inches in diameter and closed with a stopper at the bottom. About 80 percent of this column contains basic alumina, grade "Brockmann I" (Fisher), 80–200 mesh. The column is warmed to about 45° C. by external heating. The alumina is allowed to saturate with the chloroform solution over a period of 40 minutes. Then the stopper at the bottom is opened and the chloroform solution is allowed to leave the column at a rate of about 2 milliliters/minute. Additional fresh chloroform is gradually added at the top of the column to maintain pressure and to wash out residual phosphonate. After stripping the chlorofrom the receiver, a total yield of 23 grams of vinyl bis-β-chloroethylphosphonate was isolated in practically pure form. It was analyzed by GLC (Gas-Liquid-Chromatography).

In a continuous operation, chloroethylphosphonate solution is continuously added to the column and washing with fresh chloroform is postponed until the dehydrohalogenating capacity of the alumina is exhausted. This point is detected by a periodic GLC check of the effluent liquor. After washing with fresh chloroform, drying the alumina at 80° C. and dehydrohalogenating it at 800 – 1,000° C. for 30 minutes, the alumina is reactivated and ready for reuse.

What is claimed is:

1. The process for regenerating spent basic alumina catalyst from a process for the production of α,β-olefinically unsaturated alkyl phosphonate esters by the dehydrohalogenation of the corresponding β-haloalkylphosphonate ester by contacting the said haloalkylphosphonate with basic alumina which comprises heating said spent basic alumina catalyst to a temperature in excess of 200° C.

2. The process of claim 1 wherein the spent catalyst is regenerated by heating to a temperature of from 200° to over 1,000° C.

3. The process of claim 1 wherein the spent catalyst is regenerated by heating to a temperature of from 800° to 1,000° C.

4. The process of claim 1 wherein essentially pure hydrogen chloride is recovered.

5. The process of claim 1 wherein the spent catalyst is washed with aqueous sodium hydroxide prior to heat treatment.

* * * * *